(12) United States Patent
Spegar

(10) Patent No.: US 7,568,464 B2
(45) Date of Patent: Aug. 4, 2009

(54) BARREL-STYLE CHARGE MOTION CONTROL VALVE FOR V-CONFIGURATION ENGINES

(75) Inventor: Timothy D. Spegar, Honeoye Falls, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/903,115

(22) Filed: Sep. 20, 2007

(65) Prior Publication Data

US 2009/0078229 A1    Mar. 26, 2009

(51) Int. Cl.
    *F02B 31/00* (2006.01)
(52) U.S. Cl. .................. 123/306; 123/190.6; 123/308; 123/432; 123/190.1
(58) Field of Classification Search ............. 123/337, 123/336, 319, 184.1, 339.23, 184.21, 190.1, 123/190.6, 306, 308, 432
    See application file for complete search history.

(56) References Cited

U.S. PATENT DOCUMENTS

| | | | | |
|---|---|---|---|---|
| 3,534,716 A | * | 10/1970 | Odawara et al. | 123/302 |
| 4,484,543 A | * | 11/1984 | Maxey | 123/80 BA |
| 4,738,233 A | * | 4/1988 | Hitomi et al. | 123/190.2 |
| 5,749,335 A | * | 5/1998 | Flanery et al. | 123/337 |
| 6,520,147 B1 | * | 2/2003 | Kanno | 123/339.23 |
| 6,877,478 B2 | * | 4/2005 | Kim et al. | 123/306 |
| 6,923,156 B2 | * | 8/2005 | Iwata et al. | 123/336 |
| 7,077,099 B2 | * | 7/2006 | Fujieda et al. | 123/295 |

* cited by examiner

*Primary Examiner*—Stephen K Cronin
*Assistant Examiner*—J. Page Hufty
(74) *Attorney, Agent, or Firm*—Paul L. Marshall

(57) ABSTRACT

An apparatus and method for controlling charge motion in the air intake manifold includes a barrel-style valve rotatably mounted in the lower air intake manifold between the linearly arranged set of air inlets and the first and second sets of laterally offset air outlets which branch to the first and second cylinder banks, respectively. The barrel valve includes a plurality of openings and is rotatable between a fully open position wherein the plurality of openings are in alignment with the respective air inlets and outlets in the lower manifold allowing substantially unimpeded airflow therethrough, and fully closed position wherein the plurality of openings are substantially fully out of alignment with the respective air inlets and outlets substantially preventing air flow therethrough while allowing air flow through an air bypass formed adjacent to each air inlet and outlet pair.

6 Claims, 5 Drawing Sheets

BARREL-STYLE CHARGE MOTION CONTROL VALVE FOR V-CONFIGURATION ENGINES

TECHNICAL FIELD

The present invention relates to flow control devices and methods in an internal combustion engine, and more particularly relates to a charge motion control device and method for improved control of air or air/fuel mixture flow through the intake manifold of a V-type engine.

BACKGROUND OF THE INVENTION

It is generally known in the art of internal combustion engine design to use charge motion control valves in an intake manifold. The "charge" is understood to mean the air or air-fuel mixture being delivered to the combustion camber. "Charge motion" is a purposely induced, preferential movement of the charge for more controlled burning in the combustion chamber. There are basically two main types of induced charge motion: tumble and swirl. "Tumble" is understood to mean bulk charge rotation about an axis perpendicular to the longitudinal axis of the cylinder. "Swirl" is bulk charge rotation about an axis generally parallel to the cylinder axis. Today's prevalent method for varying tumble and/or swirl in an engine is through the use of valves that are configured to preferentially direct air flow through the intake runners and/or combustion chamber. The valves may be programmed to work during certain selected engine conditions to control mixing in the combustion chamber.

FIG. 1 is a prior art representation of an engine cylinder 1 having a piston 2, an air intake valve 3 and air exhaust valve 4 connected at the cylinder head 5. A prior art tumble control valve is typically positioned in the air intake runner 6 which extends from the air intake manifold (not shown in FIG. 1), leading to cylinder 1. A prior art tumble control valve generally comprises a valve flap or blade 7 pivotally disposed within the intake runner 6. The valve blade 7 pivots about point 7' between fully open (dotted line) and fully closed (solid line) positions. When in the fully closed position shown in solid line, blade 7 lies substantially perpendicular to the longitudinal extent of intake runner 6. In this position, the bottom (longer) edge of the blade 7 lies in close relationship to the internal cavity of the runner 6, thus effectively sealing off this area to air flow. Conversely, the top (shorter) edge of the blade 7 lies in spaced relation to the internal cavity of the runner 6 to define a gap wherethrough air may flow. Thus, in the fully closed position of the valve blade 7, maximum tumble is generated in engine cylinder 7 since the air flow represented by the directional arrows is forced to pass through the gap defined close to the internal cavity wall of the runner.

When engine conditions indicate tumble or swirl are not needed, the valve 7 opens (dotted line) to allow air flow through the runner in the normal manner. However, it will be appreciated that even when the valve blade is in the fully open position (extending parallel to the extent of the runner 6), the mass of the blade remains positioned within the runner 6 and therefore necessarily blocks some of the air flow through the runner. Even a slight a blockage in the air intake runner is undesirable in that it diminishes engine performance.

It would therefore be desirable to have a charge motion control valve and method which does not present any blockage to air flow through the runner when the valve is in the fully opened position.

The charge motion control valves are typically positioned in each air intake runner in close proximity to the inlet to the engine head port and intake valve. If the valves are located at too great a distance, the tumble or swirl effect is reduced or eliminated before the air intake charge enters the combustion chamber. In some applications, a shelf or flow divider is placed in the runner, just downstream of the charge motion valve, to extend the biased flow closer to the intake valve in the head. Because of the need to have the charge motion control valves close to the intake valve in the head, V6 and V8 applications of tumble and swirl control have required two sets of valves, one set for the right bank and one set for the left bank of the engine.

A common actuator is usually employed to drive both sets of motion control valves. An exposed linkage extends from either side of the actuator to drive each of the two sets of valves. This linkage arrangement between the two sets of valves has drawbacks such as wear and breakage of the linkage parts, the added parts cost and space requirements within the engine compartment, for example. Although two shafts and associated linkages to the actuator are not required In a straight, in-line engine, the fact that the tumble control valves must be placed close to the cylinder heads places limitations on engine and manifold design and creates possible valve failure due to the high heat environment in the vicinity of the combustion chambers.

It would therefore be furthermore desirable to have a charge motion control valve and method for a V-type engine that does not require external linkages nor individual charge motion control valves for each set of engine cylinder banks.

SUMMARY OF THE INVENTION

The present invention successfully addresses the shortcomings of the prior art by providing in a first aspect of the invention a charge motion control device and method that utilizes a barrel-type valve that does not block the air intake runners in any way when in the fully open position. The valve may furthermore be controlled through a single drive shaft to control air flow to both the right and left cylinder banks of a V-type engine. In another aspect of the invention, a runner bypass is positioned radially outwardly of the valve at each intake runner wherethrough air is directed when the valve is closed. Since the runner bypass induces the desired air motion close to the cylinder head, the valve can be positioned further away from the high temperature environment of the combustion chamber. Although detailed description of the preferred embodiment herein will be directed to a V-type engine, it is understood that the invention is useful in both in-line and V-type engine designs.

The air intake manifold delivers air through individual runners, one for each cylinder of the engine. Thus, in a V-6 engine for example, six individual runners extend to deliver air to the six cylinders of the engine, respectively. In the upper part of the manifold, the runners may be arranged in generally linear fashion. At the lower part of the manifold, one half of the upper runners (three in the V-6 example) branch to the first bank of cylinders while the other half of runners branch to the second bank of cylinders of the engine. A central manifold bore is located at the juncture of the generally linearly arranged upper runners and the two sets of lower runners branching to the first and second cylinder banks, respectively.

The charge motion control valve is a barrel-type valve having an elongated cylindrical body coaxially positioned in the central bore of the lower manifold part. The barrel valve is controlled through a single drive shaft which greatly improves the overall manifold design as discussed above. The barrel valve includes a plurality of openings along the length thereof, one for each runner. The valve openings are arranged such that they may simultaneously align with the air inlets (i.e., the air coming into the central bore from the upper manifold runners) and air outlets (i.e., the air leaving the central bore and leading to the cylinder banks) of the lower manifold central bore. This is considered the fully open position of the valve. It will thus be appreciated that no part of the valve body remains situated in the runner path as occurs with the prior art valve blade as discussed above. As such, the barrel valve does not negatively impact engine performance.

The valve may be rotated by an actuator in response to engine load conditions between the fully open position and a fully closed condition wherein all valve openings are simultaneously out of alignment with the air inlets and air outlets of the lower manifold central bore. When in the fully closed position, air is directed through each runner bypass to create the desired charge motion in the engine cylinders.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
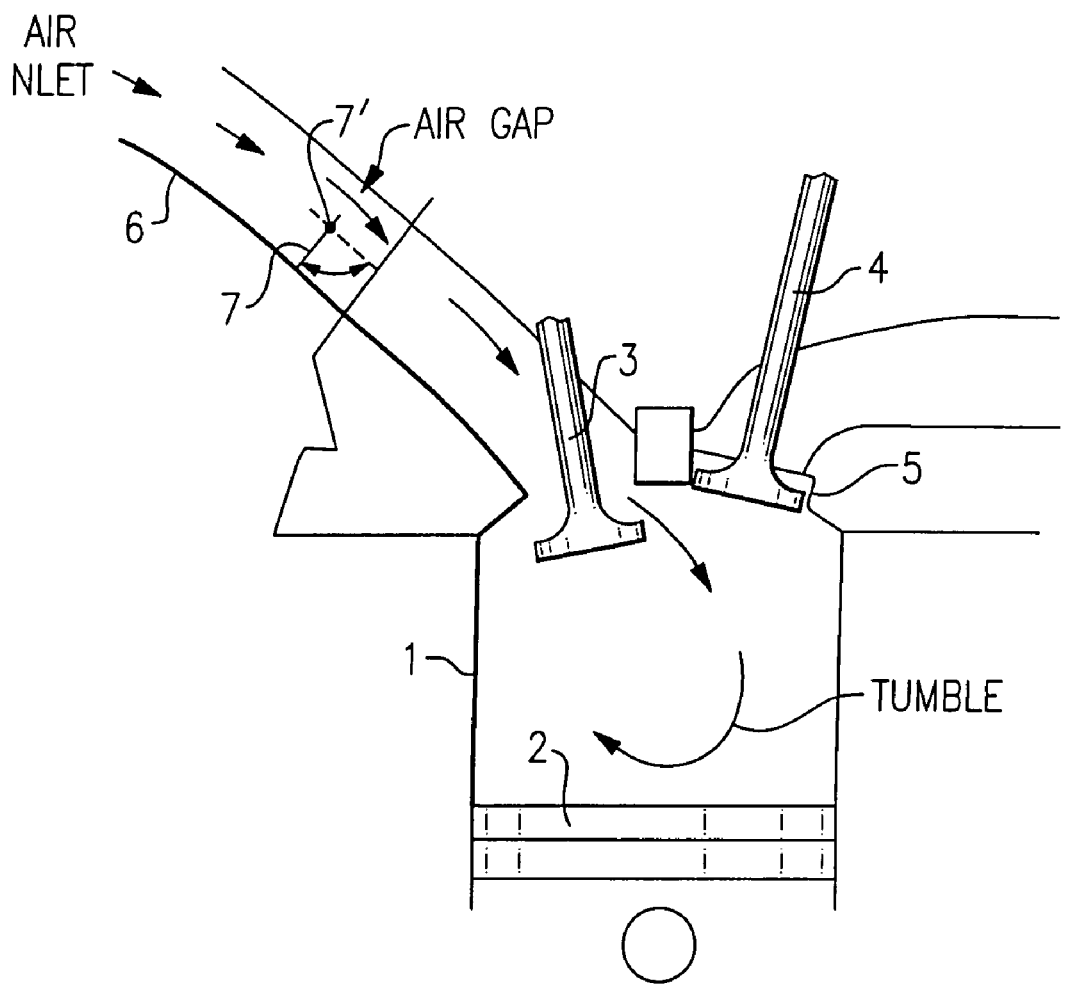
FIG. 1 is a simplified cross-sectional view of a prior art charge motion control valve leading to an engine cylinder.

Referring now to the drawings, there is seen in FIGS. 2-4B a preferred embodiment of the inventive charge motion control device incorporated into an air intake manifold assembly designated generally by the reference numeral 10. It is understood that intake manifold assembly 10 is provided for purpose of description only and the invention is not limited to the particular manifold design shown in the FIGS. Rather, the invention is applicable to any manifold design which could benefit from the advantages the present invention offers as further explained below.

Figure 2:
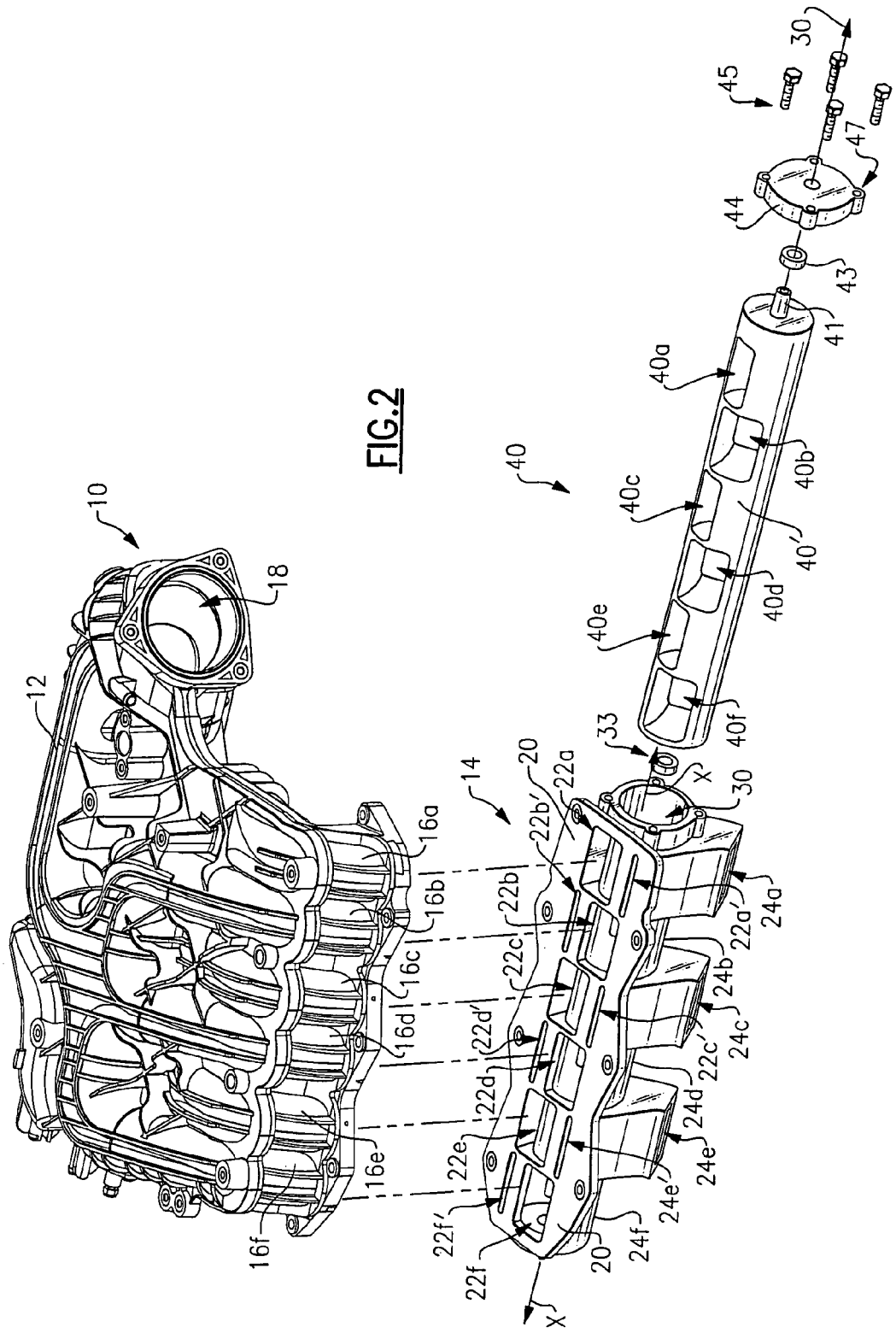
FIG. 2 is an exploded isometric view of an embodiment of the invention in spaced relation to an upper air intake manifold.
Figure 3A:
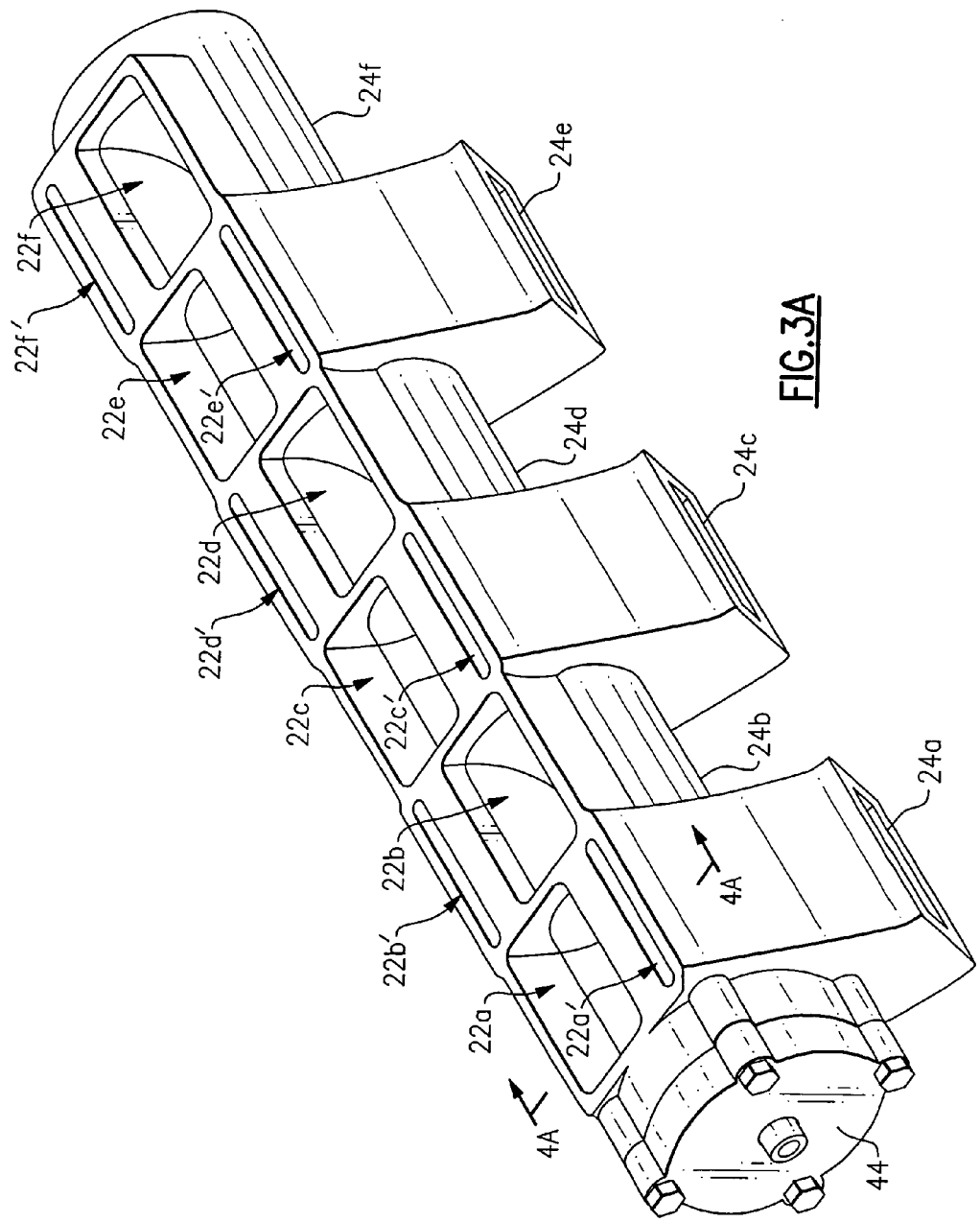
FIG. 3A is a perspective view of an embodiment of the invention in the assembled condition.
Figure 3B:
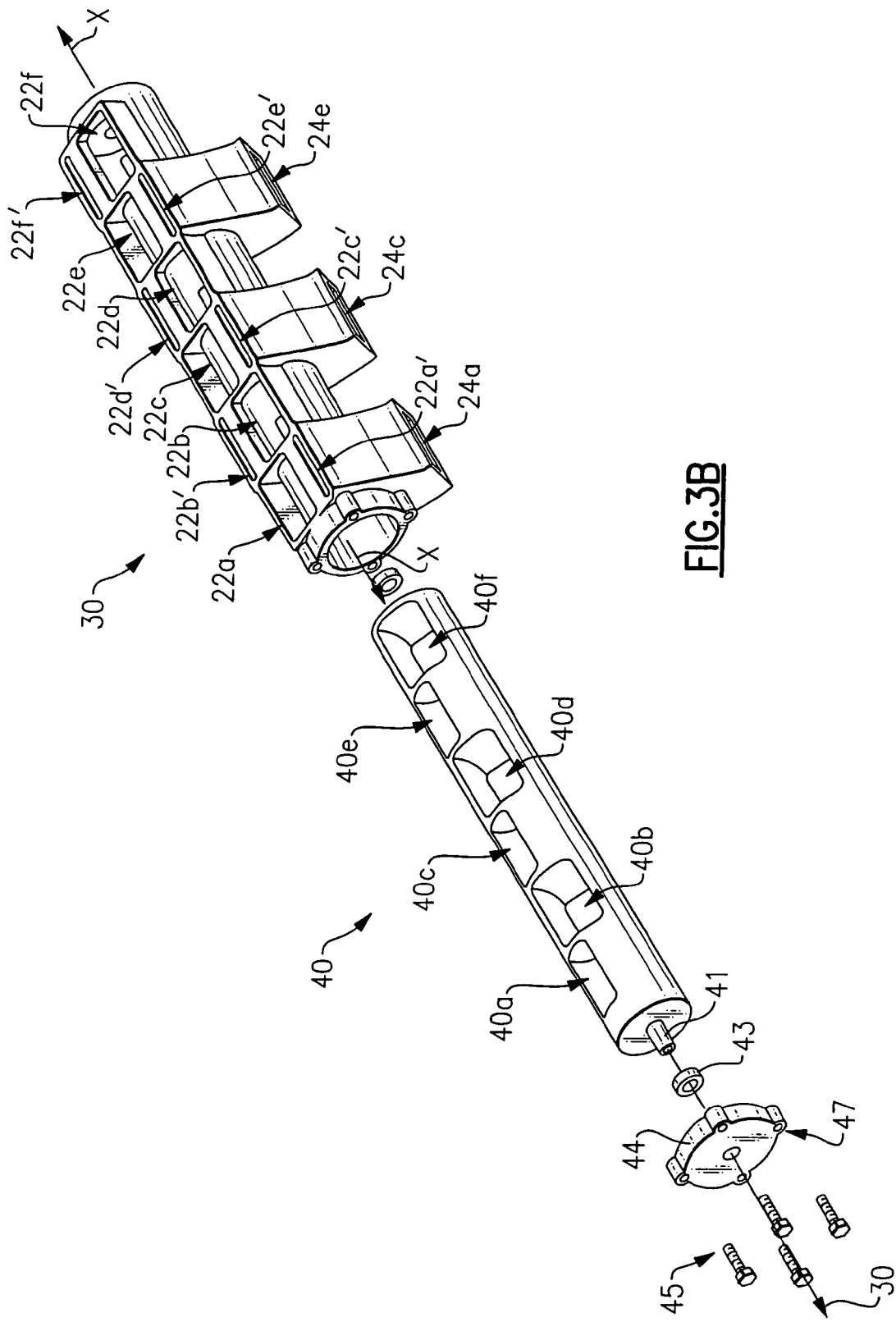
FIG. 3B is a perspective view of the view of FIG. 3A in the unassembled condition.

Referring to FIG. 2, an air intake manifold having a first or upper manifold portion 12 and a second or lower manifold portion 14 is provided to deliver air to the engine cylinder combustion chambers of an internal combustion engine (not shown). While the invention is shown incorporated into a lower manifold portion 14 which is intended to be attached to the upper manifold portion 12, the upper and lower manifold portions 12, 14 may be formed as a unitary piece. In the illustrated embodiment, the upper manifold 12 includes six upper manifold runners 16a-16f although the number of runners in the particular manifold design being employed will vary depending on the number of engine cylinders for which the manifold is designed. The upper manifold runners 16a-16f extend and receive air from a main air intake port 18.

Lower manifold 14 includes a mounting surface 20 for mounting part 14 to upper manifold part 12. Lower manifold further includes six runner air inlets 22a-22f and bypass inlets 22a'-22f formed therein, respectively. During assembly of the upper and lower manifold portions 12 and 14, lower manifold runner inlets 22a-22f and bypass inlets 22a'-22f are placed in registration with upper manifold runners 16a-16f, respectively. Each respective set of openings 16a-16f and inlets 22a-22f and respective bypass 22a'-22f is arranged in a generally linear fashion.

At lower manifold portion 14, runner air inlets 22a-22f extend into a central bore 30 extending axially along axis X-X which further includes respective lower manifold runner air outlets 24a-24f. Air outlets 24a-24f alternately branch off and extend in opposite, non-linear fashion so that three outlets 24b, 24d and 24f thereof may be aligned with and mounted in registration with a first bank of cylinder of a V-6 engine (not shown), while the other three outlets 24a, 24c and 24e thereof may be aligned with and mounted in registration with the second bank of cylinders. In the preferred embodiment, lower manifold runners 24a-24f alternately branch away in different directions although this may vary as desired. As stated above, a V-6 engine application is only an exemplary embodiment of the invention and the particular number and arrangement of runners will depend on the engine for which the manifold is designed.

A charge motion control barrel valve 40 is provided and coaxially extends within bore 30. Valve 40 includes six openings 40a-40f which are arranged along valve 40 such that they may simultaneously align with air inlets 22a-22f of lower manifold 14, respectively, which is considered the fully open position of the valve as seen best in FIG. 4A. Valve rotation is imparted via a drive shaft 41 extending from an end of valve 40 which is journaled in a bearing 43 and mounting plate 44 via suitable securing means such as bolts 45, for example. An actuator (not shown) connects to drive shaft 41 to impart rotational movement to valve 40 as dictated by the engine conditions. When the engine determines tumble and/or swirl is desirable, valve 40 is rotated away from the fully open position which closes off the air inlets 22a-22f due to the cylindrical valve body surface 40' becoming aligned with and thus blocking the air inlets 22a-22f (see FIG. 4B). At this fully closed position, valve openings 40a-40f are completely out of alignment with each pair of air inlets 22a-22f and air outlets 24a-f, respectively. Of course the valve may operate at any position between the fully open and fully closed conditions and change rotational position in direct response to engine operating conditions. It will furthermore be noticed in FIG. 4A and 4B that the contour 23 of the inner wall of central bore 30 is formed in a cylindrical shape to accommodate the contour of the valve body surface 40' through all degrees of rotation thereof.

Figure 4A:
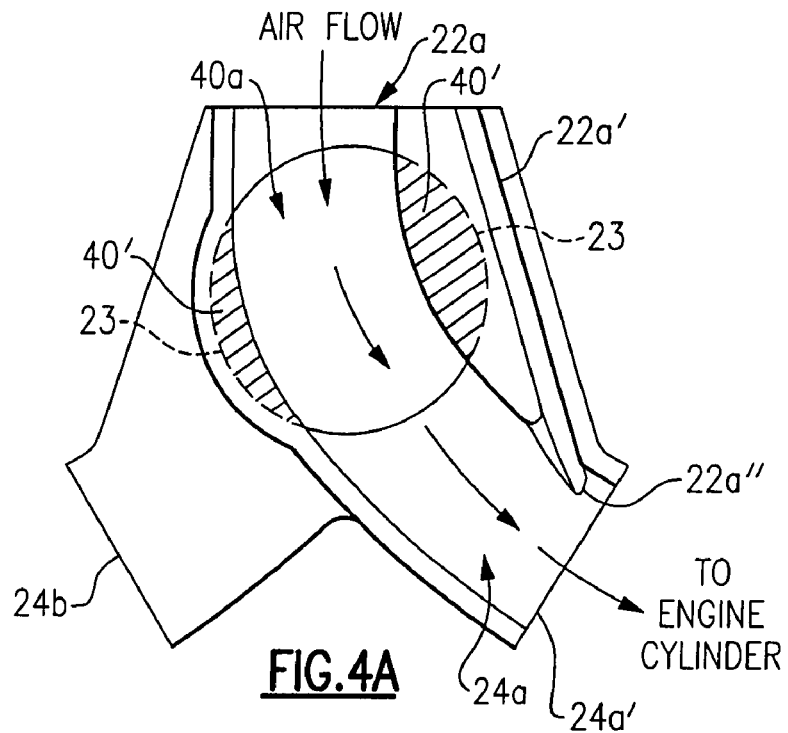
FIG. 4A is a cross-sectional view as taken generally along the line 4-4 in FIG. 3A showing the valve in the open position.
Figure 4B:
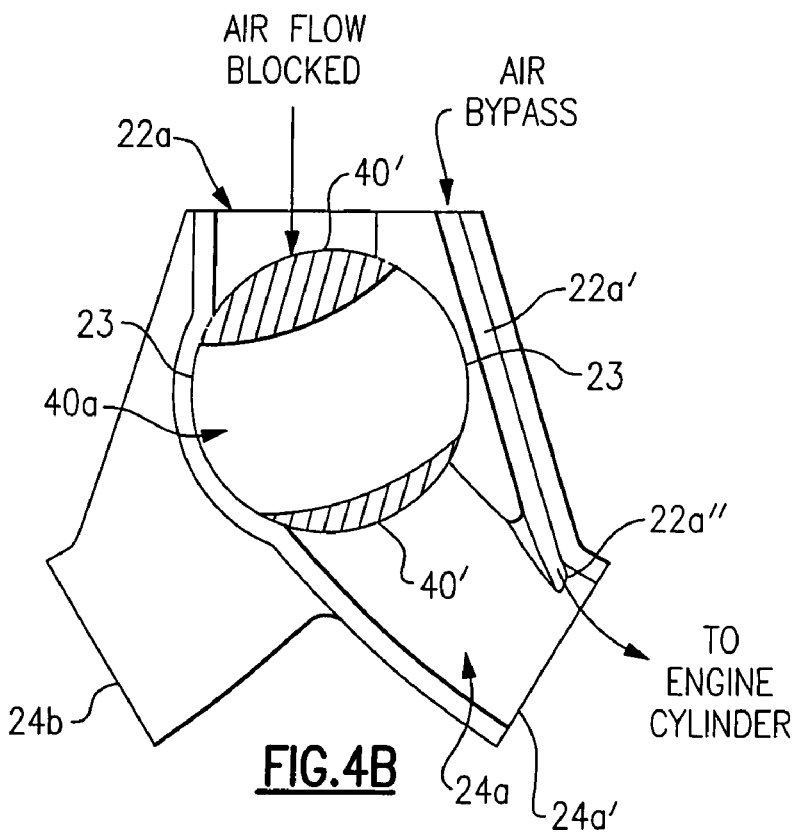
FIG. 4B is the view of FIG. 4A showing the valve in the fully closed position.

In the embodiment shown and described herein, a rotation of about 90° is required to move valve 40 between the fully open and fully closed positions seen in FIGS. 4A and 4B, respectively, although this may be varied through appropriate valve and manifold geometry design as desired for a particular engine design. For example, the geometry of valve 40 and manifold 14 may be selected to require a 45°, 60°, 120°, or any other degree rotation to move between the fully open and fully closed conditions of the valve.

It will thus be appreciated that the present invention provides a single valve element 40 having a single drive shaft 41 which is operable to control air flow through all of the air manifold runner inlets and outlets leading to the engine cylinders. Since valve 40 is a unitary piece which controls all air inlets and outlets in the lower manifold 14, it may be driven by a single drive shaft and no linkages are required as in the prior art where two separate drive shafts, one for each cylinder bank, are required and driven by a common actuator as explained above. Although the preferred embodiment herein described and shown does not include linkages between the actuator and drive shaft, it is possible that a simple linkage may be required if the actuator must be placed offset from the drive shaft. Such offsetting of the actuator with respect to the drive shaft may be necessary in some engine compartment designs.

Each respective runner inlet and outlet pair 22a, 24a-22f, 24f each include a respective runner bypass 22a'-22f' positioned radially outwardly thereof as best seen in FIGS. 4A and 4B. When the valve is in the closed position seen in FIG. 4B, the valve blocks airflow through the corresponding lower manifold runner air inlet 22a as explained above. Hence, air is diverted through the respective bypass 22a' which is outboard of and thus not blocked by the closed valve 40. Although the closed valve 40 is illustrated in the preferred embodiment as substantially completely blocking air from flowing through lower manifold runner air inlet 22a, it is understood that the valve geometry for a particular application may allow some air to pass through the runner even when the valve is completely closed.

The outlet end 22a" of the runner bypass 22a is positioned and shaped to induce a preferred motion to the air flow as it enters lower manifold runner 24a. In the preferred embodiment, the bypass outlet end 22a" is positioned close to one side of the respective lower manifold runner 24a preferably near the cylinder head mounting end 24a' thereof. As such, tumble or swirl is induced in the lower manifold runner air outlet 24a in a position very close-to the respective cylinder head. As explained above, it is desirable to induce tumble or swirl as close to the cylinder head as possible.

Alternate embodiments may position the bypass outlet end closer to or even directly at the center of the runner so long as the intended and preferred motion to the air flow is induced. For example, charge motion may be induced simply by orienting the bypass outlet end 22a" to direct air in a direction transverse to the longitudinal extent of the runner, regardless of radial position of the outlet within the runner.

The engine control system (not shown) operates the actuator to move shaft 41 and thus also charge motion control valve 40 in accordance with engine conditions. When the system determines a charge motion such as tumble or swirl is required, the actuator drives shaft 41 to close the charge motion control valve 40. As such, air is diverted through the bypasses 22a'-22f' in each lower manifold runner and motion such as tumble or swirl is induced to the charge. When the valve 40 is open as shown in FIG. 4A, air may continue to flow through the bypasses in addition to the lower manifold runners, however, this would not induce appreciable tumble or swirl since the air movement is not biased away from linearly following the longitudinal extent of the runner. If desired, another valve could be placed to close off the bypass during times when the charge motion control valve is open. The induced charge motion may of course be modified and fine-tuned to particular application requirements by changing the position and/or geometry of the bypass and/or respective runner. For example, various velocity and charge motion profiles can be designed through appropriate selection of bypass and manifold runner diameters and geometries. Such design selections and modifications are well within the abilities of those skilled in the art.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A charge motion control valve assembly for use in a V-type engine having first and second cylinder banks, said valve assembly comprising:
   a) a manifold for mounting to a V-type engine, said manifold having a plurality of air inlets extending in generally linear fashion into an axially extending central bore, a first plurality of air outlets extending generally radially from said bore and directed toward said first cylinder bank, and a second plurality of air outlets axially interspersed with each alternating outlet of said first plurality of outlets, extending generally radially from said bore and directed toward said second cylinder bank with an azimuthal angle defined between said first plurality of outlets and said second plurality of outlets;
   b) a single elongated barrel valve coaxially and rotatably mounted in said manifold bore between said plurality of respective air inlets and air outlets, said barrel valve having a first plurality of passages therethrough between a first plurality of inlet openings and a first plurality of outlet openings, and a second plurality of passages therethrough having a second plurality of inlet openings and a second plurality of outlet openings axially interspersed with each alternating passage of said first plurality of passages, having an azimuthal angle between said first and second pluralities of outlet openings generally corresponding to said azimuthal angle between said first plurality of outlets and second plurality of air outlets wherein each passage is arranged to axially align with one air inlet and one air outlet;
   whereby said barrel valve is rotatable between a fully open position with said inlet and outlet openings being simultaneously and fully aligned with each respective pair of air inlets and air outlets to allow unimpeded air flow therethrough, and a fully closed position with said inlet and outlet openings being simultaneously and fully out of alignment with each respective pair of air inlets and air outlets to substantially prevent air flow therethrough.

2. The charge motion control valve of claim 1, and further including an air bypass extending from each said air inlet to a respective air outlet whereby air may flow through said air bypass when said barrel valve is in said fully closed position, each said air bypass having an outlet end positioned to direct air exiting said bypass such that a charge motion is induced.

3. The charge motion control valve of claim 1 wherein said first and second plurality of barrel valve openings are positioned to require about a 90 degree rotation of said barrel valve between said fully open and fully closed positions.

4. The charge motion control valve of claim 2 wherein said bypass outlet end may be positioned at or near the cylinder head of the engine.

5. The charge motion control valve of claim 1 wherein said barrel valve may operate at any position between said fully open and fully closed positions.

6. A method of inducing charge motion in the cylinders of a V-type engine having first and second banks of cylinders, said method comprising the steps of:
   a) providing an air intake manifold having:
      i.) a plurality of air inlets arranged in a generally linear fashion;
      ii.) an axially extending, central manifold bore into which said plurality of air inlets lead; and
      iii.) a plurality of air outlets respectively extending from said plurality of air inlets and generally radially from said central manifold bore, said air outlets having a first set thereof leading toward said first cylinder bank and a second set thereof axially interspersed among the first set thereof and leading toward said second cylinder bank at an azimuthal angle relative to the first set thereof;

b) providing a barrel type valve having a first plurality of passages extending therethrough between a first plurality of inlet openings and a first plurality of outlet openings, and a second plurality of passages therethrough having a second plurality of inlet openings and a second plurality of outlet openings axially interspersed with each alternating passage of said first plurality of passages, having an azimuthal angle between said first and second pluralities of outlet openings generally corresponding to said azimuthal angle between said first plurality of outlets and said second plurality of air outlets wherein each passage is arranged to axially align with one air inlet and one air outlet;

c) rotatably positioning said valve in said central manifold bore, said valve being rotatable between fully open and fully closed positions with said valve inlet openings being in and out of alignment with said air inlets and said valve outlet openings being in and out of alignment with said air outlets, respectively, said valve inducing a charge motion when in said closed position; and d) causing said valve to rotate in response to engine conditions whereby said valve rotates to said closed position when the engine condition requires a charge motion.

* * * * *